(Model.)
A. J. NELLIS.
Cultivator.
No. 241,697. Patented May 17, 1881.
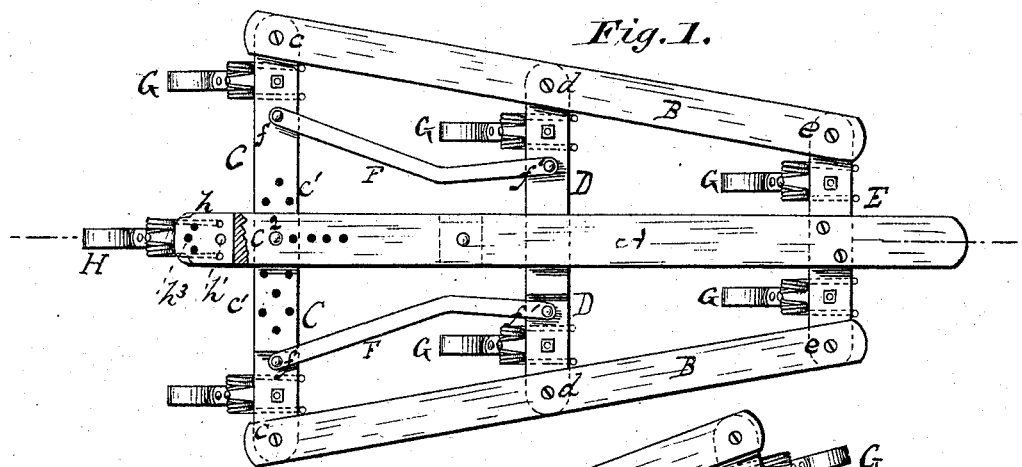
Fig. 1.
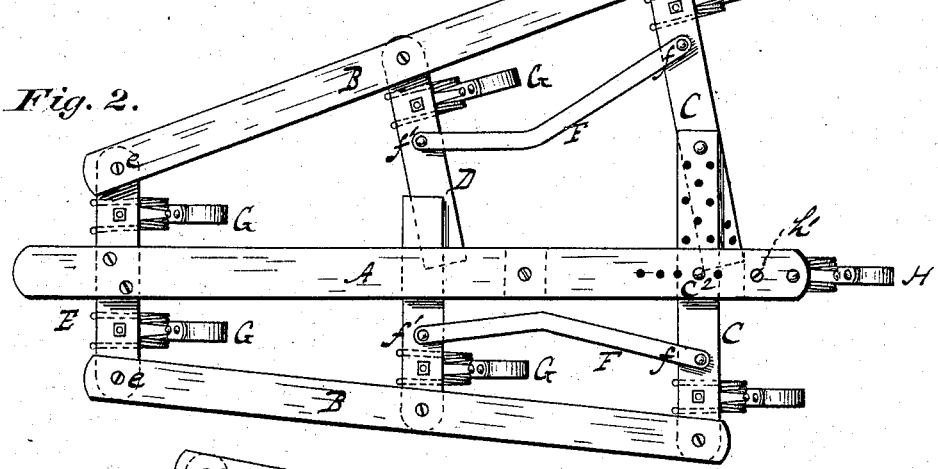
Fig. 2.
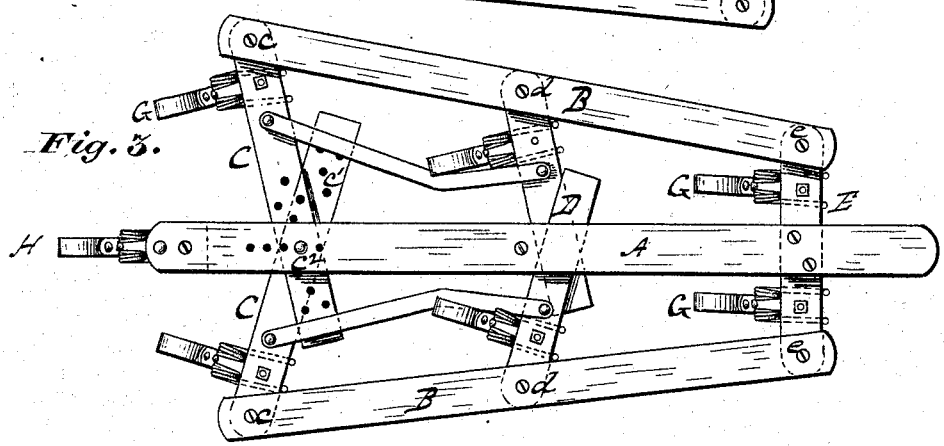
Fig. 3.
Fig. 4.
Witnesses:
Chas. S. Hyer.
C. A. Neale
Inventor.
Aaron J. Nellis
by F. W. Ritter Jr. atty

UNITED STATES PATENT OFFICE.

AARON J. NELLIS, OF PITTSBURG, PENNSYLVANIA.

CULTIVATOR.

SPECIFICATION forming part of Letters Patent No. 241,697, dated May 17, 1881.

Application filed March 24, 1881. (Model.)

*To all whom it may concern:*

Be it known that I, AARON J. NELLIS, a citizen of the United States, residing at Pittsburg, in the county of Allegheny and State of Pennsylvania, have invented certain new and useful Improvements in Cultivators; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

In the drawings, Figures 1, 2, and 3 are plan views, showing different adjustments of which the cultivator is capable. Fig. 4 is a sectional view.

Like letters refer to like parts wherever they occur.

In the cultivation of corn, and in various other uses where cultivators and like implements are employed, it is necessary at times to change the relative positions of the shovels to suit the breadth of furrow, &c., and also to change their direction with relation to the line of draft, so that the earth may be turned to one side or the other, as in weeding or hilling, or to prevent the side-shifting of the cultivator, as when used on side-hills. These adjustments have heretofore been obtained by first making the side bars and center bar or draft-bar adjustable with relation to each other; and, secondly, making the shovels adjustable independently of the side bars or center bar, to which they were attached.

So far as I am aware the shovels have never heretofore been attached to independently-adjustable pivoted expansion-bars or spread-irons.

The object of my invention is to simplify the construction of the cultivator and increase the facility with which the several required adjustments of frame and shovels may be made.

To this end it consists, mainly, in attaching the shovels to independently-adjustable pivoted spread-irons or expansion-bars, whereby the relation of the side and center bars to each other, or the position of the shovels to the line of draft, either or both, may be changed by a single adjustment; and, secondarily, in specific combinations, and in details of construction, which will hereinafter more fully appear.

I will now proceed to describe my invention more specifically, so that others skilled in the art to which it appertains may apply the same.

The cultivator-frame may consist of any number of longitudinal frame-bars and transverse adjustable expansion-bars or spread-irons. In the present instance it is shown as of the usual form—that is to say, with a longitudinal center bar, A, and two side bars, B B. The longitudinal bars A B B of the frame are adjustably connected by a series of transverse expansion-bars, C D E, the first transverse bar or bars E of which may, if desired, be rigidly connected to the center bar or draft-bar, A, so that the draft will be uniform. To this transverse bar E the front ends of the side bars, B B, are pivoted, as at $e$, so as to permit the free adjustment of the side bars.

C C indicate the rear expansion-bars or spread-irons. These are pivoted to the side bars, at or near their extremities, as at $c$, so as to move freely, and are provided with a series of pin or bolt holes, $c'$, at their inner ends, which ends pass freely through long slots $a$ of the center bar, A, and may be secured by a pin or bolt, $c^2$, or equivalent devices, in any desired position.

D D are intermediate expansion-bars or spread-irons, any desired number of which may be employed. They are also pivoted to the side bars, B B, as at $d$, and their inner ends extend through a long slot, $a'$, in the center bar, A, as shown. These expansion-bars D D may be provided with holes and secured to the center bar by a pin or bolt, as in the case of the expansion-bars C, if desired, but such construction is not necessary and is not often adopted, as it increases the labor of adjustment. It would only be adopted where it was deemed desirable to set the inner shovels at a different angle from the front and rear shovels.

In order to cause the simultaneous and similar adjustment of the intermediate expansion-bars D D, and to secure the same when properly adjusted, I couple them with the rear expansion-bars, C C, by coupling bars or links F, pivoted on the expansion-bars, as at $f f'$, the links or coupling-bars being of such shape that they will not interfere with the lateral movements of the teeth or shovels during the adjustment of the same. Where a number of intermediate expansion-bars are used they will be coupled to each other, the last of the series being coupled to the rear expansion-bar.

G G indicate the shovels, which may be of any form or construction desired, and are not necessarily spring or vibrating shovels, though, for reasons which will hereinafter appear, I have chosen such shovels for the purpose of illustrating my invention. These shovels (excepting the rudder-shovel H) are attached to the expansion-bars, instead of to the longitudinal frame-bars, as heretofore, and will consequently follow the movements of the expansion-bars, so that if the expansion-bars are at a right angle to the center bar, A, or draft-bar, the shovel will stand square to the line of draft, and when the expansion-bars are adjusted at any given angle to the center bar or draft-bar the shovels will assume the same angle to the line of draft.

H indicates an independently-adjustable rudder-shovel, which can be set at any desired angle to insure the proper running of the cultivator on a side-hill, or at such times as the other shovels are necessarily or by choice all set square or at the same angle to the line of draft. This shovel is attached to a perforated swivel-plate, $h$, pivoted by a pin or bolt, $h'$, to the rear end of the center bar, A, and its adjustments are made by means of the holes $h^3$ and removable pin or bolt.

In describing the center or draft bar, A, and the expansion-bars C D E and their connections, I have spoken of the center bar as slotted for the passage of the expansion-bars, and have also so shown it in the drawings, because I deem it the most desirable construction; but it is evident that the same result can be obtained without slotting the center bar, A, by simply passing the expansion-bars across the center bar and pinning them thereto, and in various other ways, which will readily suggest themselves to the skilled mechanic.

I have also shown spring or vibrating shovels; but it is evident rigid shovels may be as readily used. The object in showing spring or vibrating shovels in this connection is because such shovels cannot be readily (or simply) arranged to swivel on the bars, as is required by former methods of adjustment, but are as readily applied as rigid shovels by my method, and therefore my method of adjustment is of material advantage where vibrating or spring shovels are desired.

The clevis and handles (not shown in the drawings) may be attached to the cultivator in the usual manner.

From the foregoing description the manner of adjusting the side bars, shovels, &c., which is as follows, will be readily understood. If it is desired simply to increase or decrease the width of the furrow without setting the shovels at an angle to the line of draft, the pin or bolt $c^2$ is removed and the expansion-bars C pushed in or drawn out at right angles to the center bar, A, the desired distance and the pin again inserted. If, in the adjustment, it is desired to set the shovels (on either or both sides) at an angle to the line of draft, in addition to pushing in or drawing out the expansion bar or bars C, the bars or corresponding bar C is moved backward or forward at its inner end until it stands at the desired angle to the center bar or line of draft, and the bars are then secured by inserting the pin or pins $c^2$.

Having thus described my invention, what I claim, and desire to secure by Letters Patent, is—

1. In a cultivator, the combination of longitudinal frame-bars, expansion-bars, or spread-irons, pivoted at one end to one of said frame-bars and independently adjustable longitudinally at the opposite end upon another of said frame-bars, and cultivator-shovels attached to the expansion-bars, substantially as and for the purpose specified.

2. In a cultivator, the combination of longitudinal frame-bars, expansion bars, or spread-irons, pivoted at one end to one of said frame-bars and independently adjustable longitudinally at the opposite end upon another of said frame-bars, and spring or vibratory shovels attached to the expansion-bars or spread-irons, substantially as and for the purpose specified.

3. In a cultivator, the combination of longitudinal frame-bars, expansion-bars, or spread-irons, pivoted at one end to one of said frame-bars and adjustable longitudinally at the opposite end upon another of said frame-bars, and a longitudinal coupling bar or bars connecting the transverse expansion-bars or spread-irons, substantially as and for the purpose specified.

4. In a cultivator, the combination of a longitudinal center bar, adjustable longitudinal side bars, transverse expansion-bars, or spread-irons, pivoted at one end on the longitudinal side bars and longitudinally adjustable independently at the opposite end upon the center bar, cultivator-shovels attached to the expansion-bars or spread-irons, longitudinal coupling-bars for connecting the transverse expansion-bars, and an independently-adjustable rudder-tooth pivoted on the rear end of the longitudinal center bar, substantially as and for the purpose specified.

In testimony whereof I affix my signature in presence of two witnesses.

AARON J. NELLIS.

Witnesses:
JAMES I. KAY,
WM. BLAKELEY.